Figure 2:
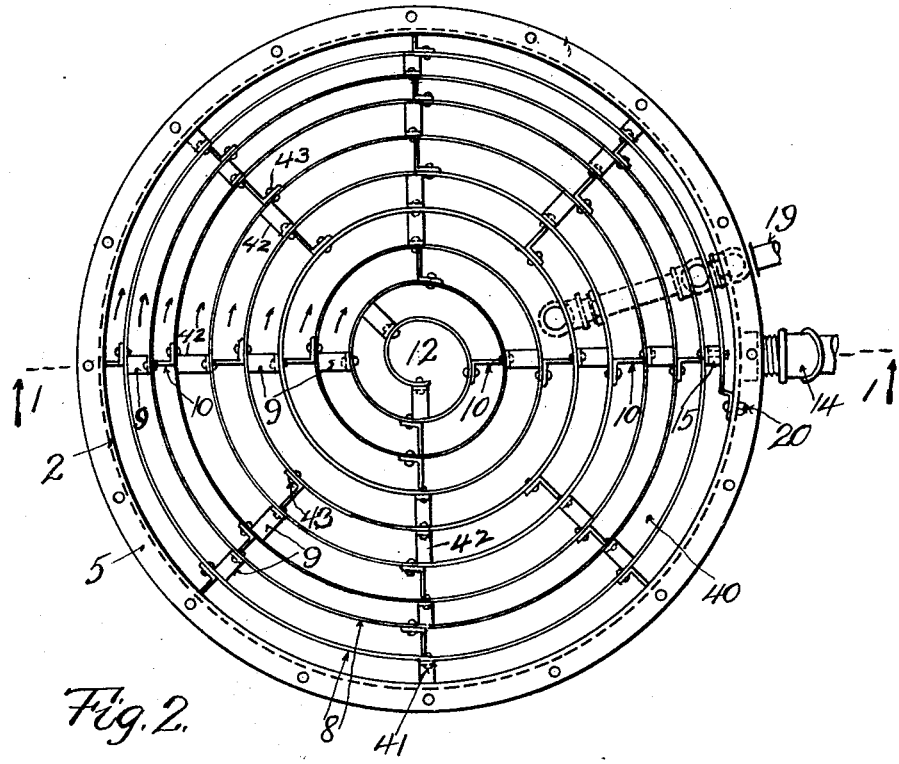

Nov. 24, 1931.   J. N. VANDEGRIFT   1,833,664
CONDENSER
Filed Nov. 10, 1927   2 Sheets-Sheet 1

INVENTOR.
James N. Vandegrift
BY
Charles G. Hensley
ATTORNEYS.

Nov. 24, 1931. J. N. VANDEGRIFT 1,833,664
CONDENSER
Filed Nov. 10, 1927 2 Sheets-Sheet 2

INVENTOR.
James N. Vandegrift
BY
Charles G. Hensley
ATTORNEYS.

Patented Nov. 24, 1931

1,833,664

UNITED STATES PATENT OFFICE

JAMES N. VANDEGRIFT, OF NEW YORK, N. Y., ASSIGNOR TO INTERNATIONAL BITUMENOIL CORPORATION, A CORPORATION OF DELAWARE

CONDENSER

Application filed November 10, 1927. Serial No. 232,360.

The present invention relates to condensers and one of the pricipal objects is to provide a condenser for the condensation of hydrocarbon or other vapors into liquid form by the most inexpensive, compact and efficient means. In the form of the invention shown in the accompanying drawings the apparatus is applicable for condensation of vapors in a wide variety of uses such as in the sugar industry, in the low temperature distillation of coal, lignites, oil shales and especially in the oil refining industry. In the latter industry it may be used in the form of a single condensing unit which is either air-cooled or water-cooled, and several of the units may be combined to form a fractionating tower, so connected as to recover condensates of different gravity. The condenser may also be used in conjunction with a suitable absorbing material placed therein, so that the device serves as a scrubber for collecting the more volatile vapors from fixed, non-condensible gases.

The present apparatus contains but a small fraction of the material, occupies but a fraction of the space, and is constructed at a fraction of the cost of the present standard pipe form of condenser or baffle chamber condenser, or dephlegmators and fractionating towers of various types for effecting the condensation of a large volume of vapors. In the present device the vapors are given a long, continuous travel in contact for a long period of time with exceptionally large metallic surfaces, all combined in a most compact form or construction.

Another object of the invention is to provide a condenser of such construction that it may be readily disassembled to permit all parts thereof to be quickly and readily cleaned and to be reassembled, so that if any of the materials handled in the apparatus should be precipitated on the condensing surfaces and adhere tenaciously thereto, the apparatus may be very quickly and easily cleared of such materials. Other advantages and features will be set forth in the following detailed description of my invention.

Figure 1:
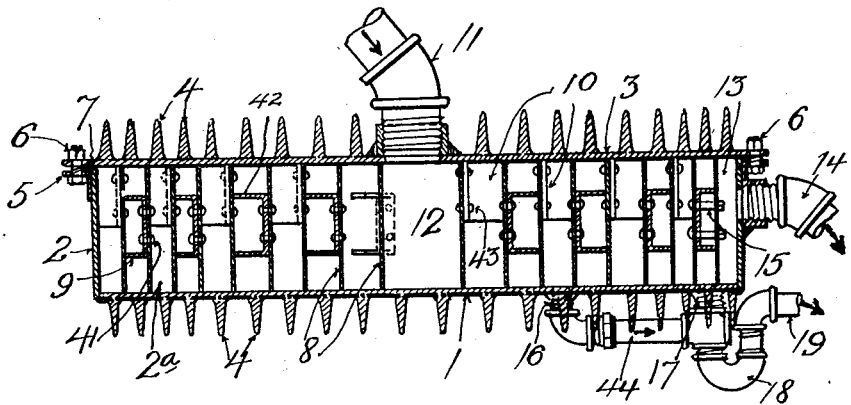
Figure 4:
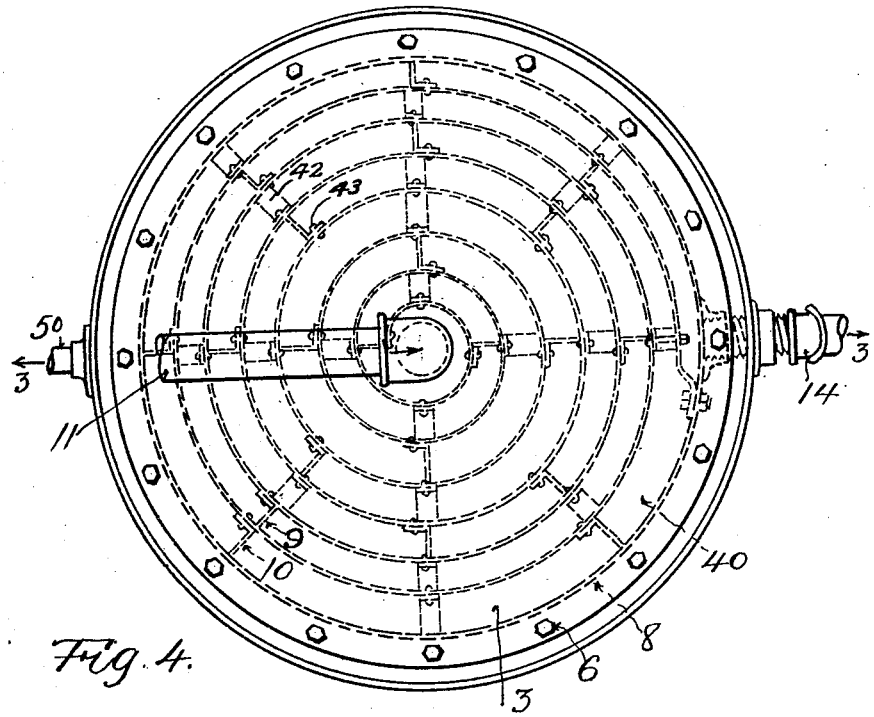
Figure 3:
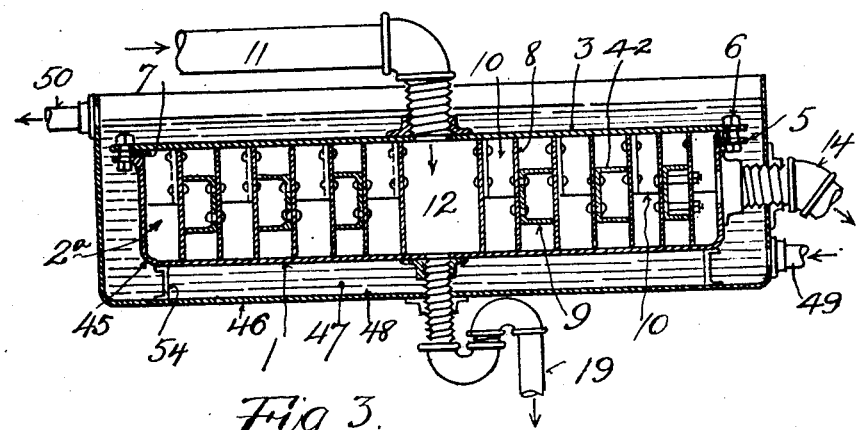

In the drawings forming part of this application,

Figure 1 is a vertical, sectional view taken centrally through a condenser embodying my invention and is taken on the line 1—1 of Figure 2, Figure 2 is a plan view of the apparatus with the top cover removed to disclose the interior construction, Figure 3 is a view similar to Figure 1, showing the apparatus adapted for water-cooling instead of air-cooling, and Figure 4 is a plan view of the water-cooled device.

It will be understood that variations may be made in the shape, proportions and disposition of the parts of the apparatus, but in the following description I will set forth what appears to me now to be the preferred construction of a unit adapted for various purposes, including the condensation of hydrocarbon vapors. In the drawings I have shown a flat, circular plate 1 of sheet steel, or cast iron, which forms the bottom of the condenser when considered in the position shown in the drawings; and this bottom is welded or otherwise attached to a cylindrical wall 2 by a joint which will be liquid and vapor proof. The cylindrical wall 2 may be made of steel or other suitable material. The height of the wall 2 is preferably low in comparison with the diameter of the compartment formed within it. The bottom wall 1 and the sidewall 2 form a compartment 2a which is divided off in the manner hereinafter described. The upper edge of the wall 2 is shown provided with a flange 5 of angle iron, having openings through which bolts 6 may be passed for the purpose of securing on the wall 2 a detachable or removable plate or cover 3. The bottom, outer wall and flanges may be constructed of pressed steel in one piece. The cooling action of the top and bottom walls 1 and 3 may, when desired, be increased by employing flanges or fins 4, which may be cast integrally with the bottom wall 1 and the top cover 3, or they may be separately formed and attached to these, either in spiral form or in parallel lines, preferably the latter. These flanges or fins 4 increase the radiating surface and also act by convection to permit the more rapid dissipation of the heat from the bottom 1 and the cover 3. Preferably, a gasket 7 is clamped between the cover 3 and the flange 5 in order to make the compartment contained within the shell both liquid and vapor-tight.

A continuous conduit for the travel of the vapors is formed by placing within the shallow chamber 2a a narrow and preferably continuous strip of sheet metal 8 the width of which corresponds to the height of the chamber or to the distance between the inner surfaces of the bottom wall 1 and the cover 3. This strip, beginning at the center 12 which is near the center of the compartment 2a, curves outwardly in the form of a true spiral, similar to a watch spring, with each successive turn increasing in distance from the central point 12 and the several turns all lying in the same plane. As this metal strip curves outwardly from the central point, each turn may be spaced a uniform distance from the next succeeding turn, or, in other words, the increase in curvature radius may be constant. In some cases, however, it may be desirable to gradually decrease the distance separating the successive turns of the spiral, so that the conduit 40 will have a progressively decreasing cross section so that there will be an increased vapor pressure as the vapors travel through the conduit toward the discharge pipe 14.

Preferably, for convenience in removal, the metal strip 8, which defines the vapor conduit and which may be in firm contact with the enclosing shell, is preferably not fixed to either the bottom plate 1 or the cover 3, but merely is pressed with its edges in contact at the top and between these members. There are attached to the strip 8 preferably by rivets 41 short channels 9 disposed at intervals along the length of the strip, so that they occur at various points in the several convolutions, these channels being riveted along one web to the strip 8, and extending at right angles thereto, so that the flanges 42 of each channel may contact with the inner surface of the next succeeding convolution of the strip 8. In addition, I have shown angles 10 having one web of each attached by rivets 43 to the face of the strip 8, and disposed at suitable distances along this strip. Preferably, the angles 10 are spaced adjacent the top of the chamber or nearer the cover 3, and alternating with the open channel spacers 9, the latter being disposed near the vertical center of the strip 8, so that these several members check the velocity or retard the vapors in their travel through the conduit, and at the same time they force the vapors alternately in contact with the top and bottom cooling plates 1, 3 of the apparatus. Vapors from the refining still or retort, or from any other source, enter the condenser through the pipe 11 which is attached to the top cover 3, so that these vapors pass through the cover 3 to the center chamber 12 which is within the first convolution of the strip 8. The vapors then pass through the conduit 40 which is the spiral space between the several convolutions of the strip 8, the other walls of the conduit being formed, as stated above, by the bottom wall 1, and the top cover 3. These vapors travel through this spiral space or conduit, and if any of the vapors are uncondensed when they have passed entirely through the conduit, they pass off through the pipe 14. As the vapors are precipitated by the condensing action, they form liquids which fall to the bottom wall 1 and the liquid thus precipitated will pass out through the discharge pipe 19. I have shown a pipe 16 connected to and opening through the bottom wall 1 to receive any liquid precipitated after the vapors have traveled but a portion of the complete length of the conduit; and from the connection 16 there is a pipe 44 which connects with another connection 17, which like the connection 16 is attached to the bottom wall 1 to receive liquids therefrom at a point adjacent the outer extremity of the spiral conduit. The liquid discharged through the connections 16 and 17 pass through a trap 18 before reaching the outlet pipe 19 in order that vapors may not pass out with the liquid. It will be apparent that the number of connections, such as 16 and 17 may be multiplied and be connected with the bottom wall 1 at any or all of the convolutions of the conduit. It is desirable that the liquid be removed through these discharge members as soon as it is precipitated where the device is being used merely to reduce vapors to the liquid stage.

It is preferable to bolt the outer terminal of the strip 8 to a spacer 15 which is placed between the two outer turns of this strip, and is attached to both, so that the entire strip 8 may be lifted and removed from the condensing chamber intact.

It will be apparent that the members 9 and 10 act as spacers to keep the several convolutions of the spiral strip 8 separated from each other in the desired manner. It will be obvious that these members may be of lesser width where they are attached to the outer convolutions of the strip 8 in order that the cross sectional area of the spiral conduit will be gradually reduced toward the outlet end of the conduit, for the purpose set forth above.

In Figures 3 and 4 I have shown the device adapted for water-cooling instead of air-cooling. Herein, the shell of the condenser and the spiral strip 8 remain the same, except that the ribs 4 on the bottom and cover may be omitted. The shell 45, and the contained parts are mounted inside a water jacket 46 which is a shell larger than the condenser shell 45 to provide a space for running water 47 entirely encircling the shell 45. Water is admitted to the space 48 between the two shells by the pipe 49 and it flows out through the pipe 50 after acting on the condenser shell 45 and its contents. The vapor pipe 11 for feeding vapors into the shell 45, passes through the open top of the jacket 46; and the vapor pipe 14 and the liquid pipe 19, all pass through the jacket 46. The shell 45 is shown resting upon the channels 54 on the bottom wall of the jacket 46. The entire strip 8 may be removed intact from the shell for the purpose of cleaning the parts, although in most instances it will be possible to remove the deposits from the condensers by flushing the conduit 40 with steam or cleansing liquid passed through the conduit, and discharging it through the outlets 14, 16, 17. The present device may be cleaned more quickly and efficiently than the numerous pipe condensers having various return bends or condensers with clusters of parallel tubes between headers such as in the devices now in general use.

In common practice it is necessary with an oil still having a five hundred barrel daily capacity, to use a series of condensing tubes of a total length of nine hundred and eighty feet having an average diameter of six inches, giving a total condensing surface of 1538 square feet, and arranged in a condensing box 23 feet by 48 feet by 12 feet, the box occupying a space of 13,248 cubic feet. This apparatus weighs about 57,700 pounds. The present condenser having the same capacity for condensation may be made 6 feet in diameter, 6 inches deep, in which the vapors will have a travel of 170 feet, the metal condensing surface of the apparatus being 226 square feet and the total weight of the condenser may be as low as 1400 pounds. Seven of these units may be arranged to operate in series, the seven being arranged in a tower 10 feet high and 6 feet in diameter. This will provide a continuous travel of the vapors of 1190 feet and 1582 square feet of condensing surface which is approximately equal to the pipe condenser above described. The total weight of the seven units under the present case will be 11,200 as compared with 57,700 of the old type of condenser; and the space occupied will be 282 cubic feet as against 13,248 cubic feet in the old type.

Having described my invention, what I claim is:

1. A condenser comprising a shell forming a fluid holding chamber including a top and bottom wall, a separately formed strip of thin metal coiled upon itself in the form of a spiral and disposed in said chamber to lie between the top and bottom walls thereof and detachably held in said chamber by said walls and co-operating with said walls to form a single spiral fluid conduit between the convolutions of said strip through which conduit fluid is adapted to travel, spacers attached to said strip and adapted to contact with an adjacent convolution of said strip for holding the several convolutions in spaced relation, said strip being adapted to conduct heat or cold rapidly to said top and bottom walls, means for introducing fluid into one part of said conduit and means for withdrawing fluid from a remote portion of said conduit from that in which it is introduced.

2. A condenser comprising a shell forming a fluid holding chamber, a separately formed strip of metal coiled upon itself in the form of a spiral and disposed in said chamber to lie between the top and bottom walls thereof and co-operating with said walls to form a single continuous spiral fluid conduit between the convolutions of said strip through which fluid is adapted to travel, said strip being adapted to conduct heat or cold rapidly to said top and bottom walls, means attached to said strip for deflecting the flow of fluid whereby the latter is directed alternately toward said top and bottom walls of said chamber, means for introducing fluid into one part of said conduit and means for withdrawing fluid from a portion of said conduit remote from that in which the fluid is introduced.

3. A condenser comprising a shell forming a fluid holding chamber having a top and bottom wall, a separately formed strip of thin sheet metal coiled upon itself in the form of a spiral detachably disposed in said chamber to lie between the top and bottom walls thereof and co-operating with said walls to form a single continuous fluid conduit between the convolutions of said strip through which fluid is adapted to travel, said strip being adapted to conduct heat or cold rapidly to said top and bottom walls, spacers attached at intervals to said strip for holding the several convolutions thereof in spaced relation, and adapted to act as baffles to check the flow of fluid and to drive it toward the bottom wall, means for introducing fluid into one part of said conduit and means for withdrawing fluid from the portion of said conduit remote from that in which it is introduced.

Signed at the city, county and State of New York the 4th day of November, 1927.

JAMES N. VANDEGRIFT.